US010785100B2

(12) United States Patent
Holness

(10) Patent No.: US 10,785,100 B2
(45) Date of Patent: Sep. 22, 2020

(54) INTERCONNECTING NETWORKS

(71) Applicant: Ciena Corporation, Hanover, MD (US)

(72) Inventor: Marc Holness, Hanover, MD (US)

(73) Assignee: Ciena Corporation, Hanover, MD (US)

(*) Notice: Subject to any disclaimer, the term of this patent is extended or adjusted under 35 U.S.C. 154(b) by 267 days.

(21) Appl. No.: 14/724,654

(22) Filed: May 28, 2015

(65) Prior Publication Data

US 2016/0352570 A1    Dec. 1, 2016

(51) Int. Cl.
*H04L 12/24* (2006.01)
*H04L 12/437* (2006.01)
*H04L 12/26* (2006.01)

(52) U.S. Cl.
CPC ........ *H04L 41/0816* (2013.01); *H04L 12/437* (2013.01); *H04L 41/0659* (2013.01); *H04L 41/0668* (2013.01); *H04L 43/0811* (2013.01)

(58) Field of Classification Search
CPC .......................... H04L 41/0816; H04L 12/437
See application file for complete search history.

(56) References Cited

U.S. PATENT DOCUMENTS

| | | | | |
|---|---|---|---|---|
| 5,241,534 A | * | 8/1993 | Omuro | H04L 45/10 370/218 |
| 7,283,466 B1 | | 10/2007 | Chen et al. | |
| 7,817,564 B2 | * | 10/2010 | Puttu | H04L 12/1895 370/242 |
| 2006/0114817 A1 | * | 6/2006 | Nishino | G06F 9/50 370/216 |
| 2008/0221918 A1 | * | 9/2008 | Petersen | G06Q 50/22 705/2 |
| 2009/0316571 A1 | * | 12/2009 | Rose | H04L 12/437 370/218 |
| 2012/0147740 A1 | * | 6/2012 | Nakash | H04L 12/437 370/221 |

FOREIGN PATENT DOCUMENTS

EP    2503737 A2    9/2012

OTHER PUBLICATIONS

Extended European Search Report in corresponding European Application No. 16171726.9 dated Oct. 5, 2016 (8 pages).

* cited by examiner

*Primary Examiner* — Zhensheng Zhang
(74) *Attorney, Agent, or Firm* — Clements Bernard Walker; Lawrence A. Baratta, Jr.; Christopher L. Bernard

(57) ABSTRACT

A method for connecting a plurality of networks. The method may include establishing a first network link between a first network element and a second network element. The first network link may implement an interconnection between a first network and a second network. The method may include establishing a second network link between the first network element and a third network element. The first network element, the second network element, and the third network element may be located on a virtual network. The method may include detecting, over the virtual network, a first network event regarding the first network link. The method may include, in response to detecting the first network event, adjusting the interconnection between the first network and the second network. The method may include disregarding a second network event regarding the second network link.

15 Claims, 5 Drawing Sheets

INTERCONNECTING NETWORKS

BACKGROUND

Many networks may have changing topologies. For instance, the logical path that a single node uses to communicate with a distant node may change regularly within a network. New nodes may join the network, while old nodes may be taken offline, either as planned or unexpectedly. As such, the route that packets take from one node to another node may need to be regularly reconfigured by the network to account for changing circumstances.

SUMMARY

In general, in one aspect, the invention relates to a method for connecting a plurality of networks. The method includes establishing a first network link between a first network element and a second network element. The first network link implements an interconnection between a first network and a second network. The method further includes establishing a second network link between the first network element and a third network element. The first network element, the second network element, and the third network element are located on a virtual network. The method further includes detecting, over the virtual network, a first network event regarding the first network link. The method further includes, in response to detecting the first network event, adjusting the interconnection between the first network and the second network. The method further includes disregarding a second network event regarding the second network link.

In general, in one aspect, the invention relates to a system for connecting a plurality of networks. The system includes a first network element, a second network element, and a third network element. The second network element is connected to the first network element by a first network link. The first network link implements an interconnection between a first network and a second network. The third network element is connected to the first network element by a second network link. The first network element, the second network element, and the third network element are located in a virtual network. The first network element is configured to adjust the interconnection in response to detecting, over the virtual network, a first network event on the first network link. The first network element is configured to disregard a second network event regarding the second network link.

In general, in one aspect, the invention relates to a non-transitory computer readable medium (CRM) storing a plurality of instructions for connecting a plurality of networks. The instructions include functionality for establishing a first network link between a first network element and a second network element. The first network link implements an interconnection between a first network and a second network. The instructions further include functionality for establishing a second network link between the first network element and a third network element. The first network element, the second network element, and the third network element are located on a virtual network. The instructions further include functionality for detecting, over the virtual network, a first network event regarding the first network link. The instructions further include functionality for, in response to detecting the first network event, adjusting the interconnection between the first network and the second network. The instructions further include functionality for disregarding a second network event regarding the second network link.

Other aspects of the invention will be apparent from the following description and the appended claims.

DETAILED DESCRIPTION

Figure 1:
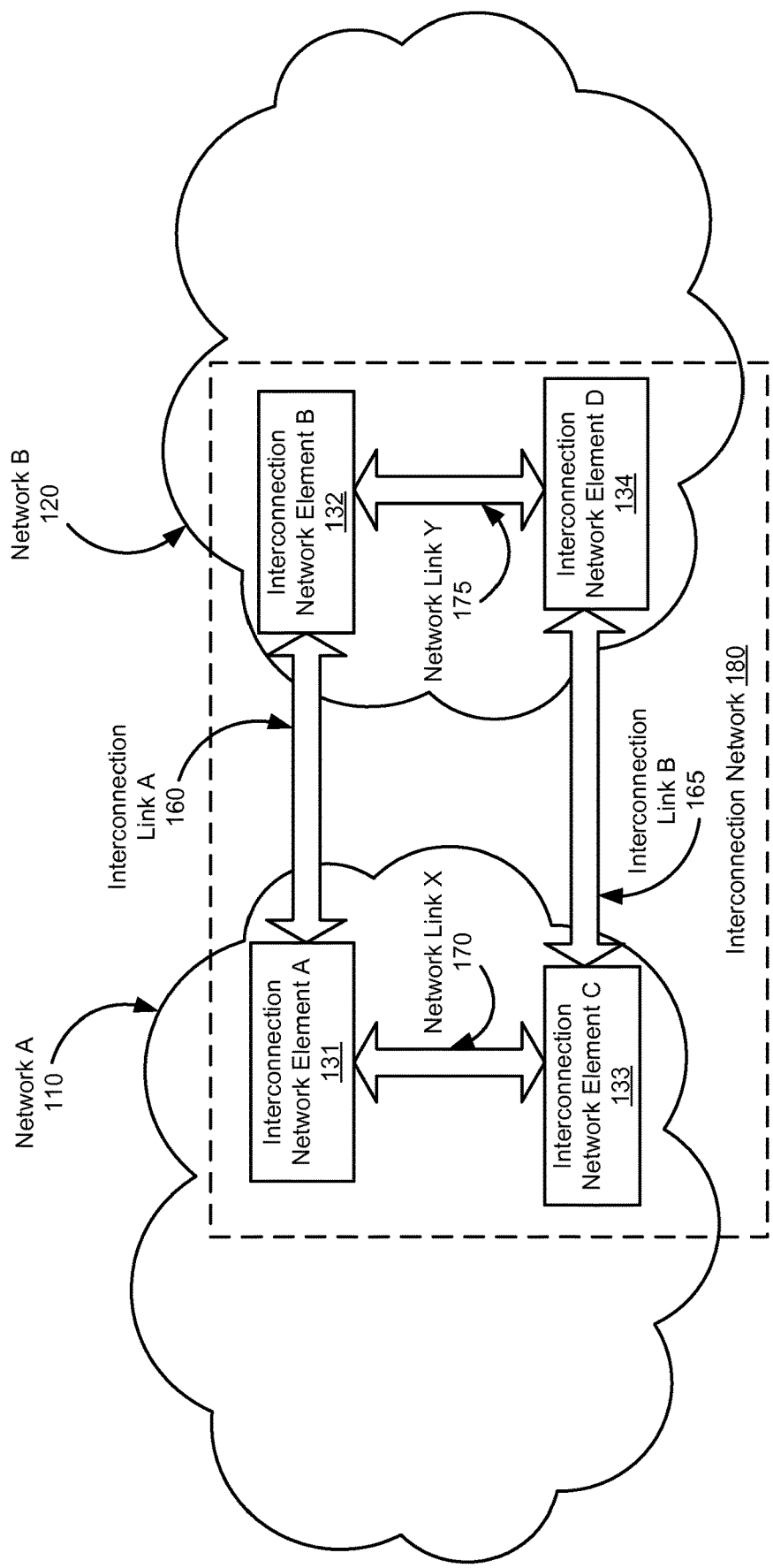
FIGS. 1 and 2 show systems in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium for connecting various networks. In particular, one or more embodiments are directed to an interconnection network (i.e., a network that connects two or more other networks) including various network elements for administering various interconnection links between the two or more other networks. For example, a particular network element on the interconnection network may be shared with a first network. This network element may form an interconnection link to a network element on a second network, while also forming a network link to another network element on the first network. As such, the particular network element may adjust an interconnection between the first and second networks based on network events that occur on the interconnection link, while disregarding network events that occur on the network link.

FIG. 1 shows a schematic of a system for connecting various networks in accordance with one or more embodiments. In one or more embodiments, the system as shown in FIG. 1 includes an interconnection network (180) connecting various networks (e.g., network A (110), network B (120)). In one or more embodiments, for example, the interconnection network (180) shares various network elements (e.g., interconnection network element A (131), interconnection network element B (132), interconnection network element C (133), interconnection network element D (134)) with the other networks (110, 120). Specifically, a network element may refer to various components such as optical switches, routers, hubs or any other logical entities for uniting one or more physical devices on one or more networks. As such, an interconnection network element may be a network element that is part of an interconnection network.

In one or more embodiments, the interconnection network (180) is a virtual network operating on various interconnection network elements (131, 132, 133, 134) and configured for establishing an interconnection between network A (110) and network B (120). An interconnection may include the physical and/or logical linking of various networks for establishing communication between nodes in the networks and/or connected to the networks (110, 120). Accordingly, the interconnection between the networks (110, 120) provides for bidirectional communication, such as multipoint-to-multipoint communication, between endpoints in network A (110) and endpoints in network B (120). The interconnection network (180) may also include network link X (170) between interconnection network elements (131, 133) located on network A (110), and network link Y (175) between interconnection network elements (132, 134) located on network B (120). In one or more embodiments, the interconnection network (180) is a ring network configured to operate a ring protocol, such as ITU-T G.8032 Ethernet Ring Protection (ERP) protocol.

Keeping with FIG. 1, network A (110) and network B (120) are connected with various interconnection links (e.g., interconnection link A (160), interconnection link B (165)). One or more of these interconnection links (160, 165) may be used to implement the interconnection between the two networks (110, 120). An interconnection link may be a network link from a network element on one network to a network element on a different network. As such, the interconnection link may be a dedicated physical path or a logical path between two networks (110, 120).

In one or more embodiments, an interconnection link is a pseudowire between two networks. For example, a pseudowire may include an emulated point-to-point connection over a packet-switching network, such as a network that uses multi-protocol label switching (MPLS) or an Internet protocol (e.g., IPv4).

Furthermore, one or more of the networks (e.g., network A (110), network B (120)) shown in FIG. 1, may include a full mesh network. For example, network A (110) or network B (120) may be a virtual private local area network service (VPLS) network or a hierarchical VPLS network.

Figure 2:
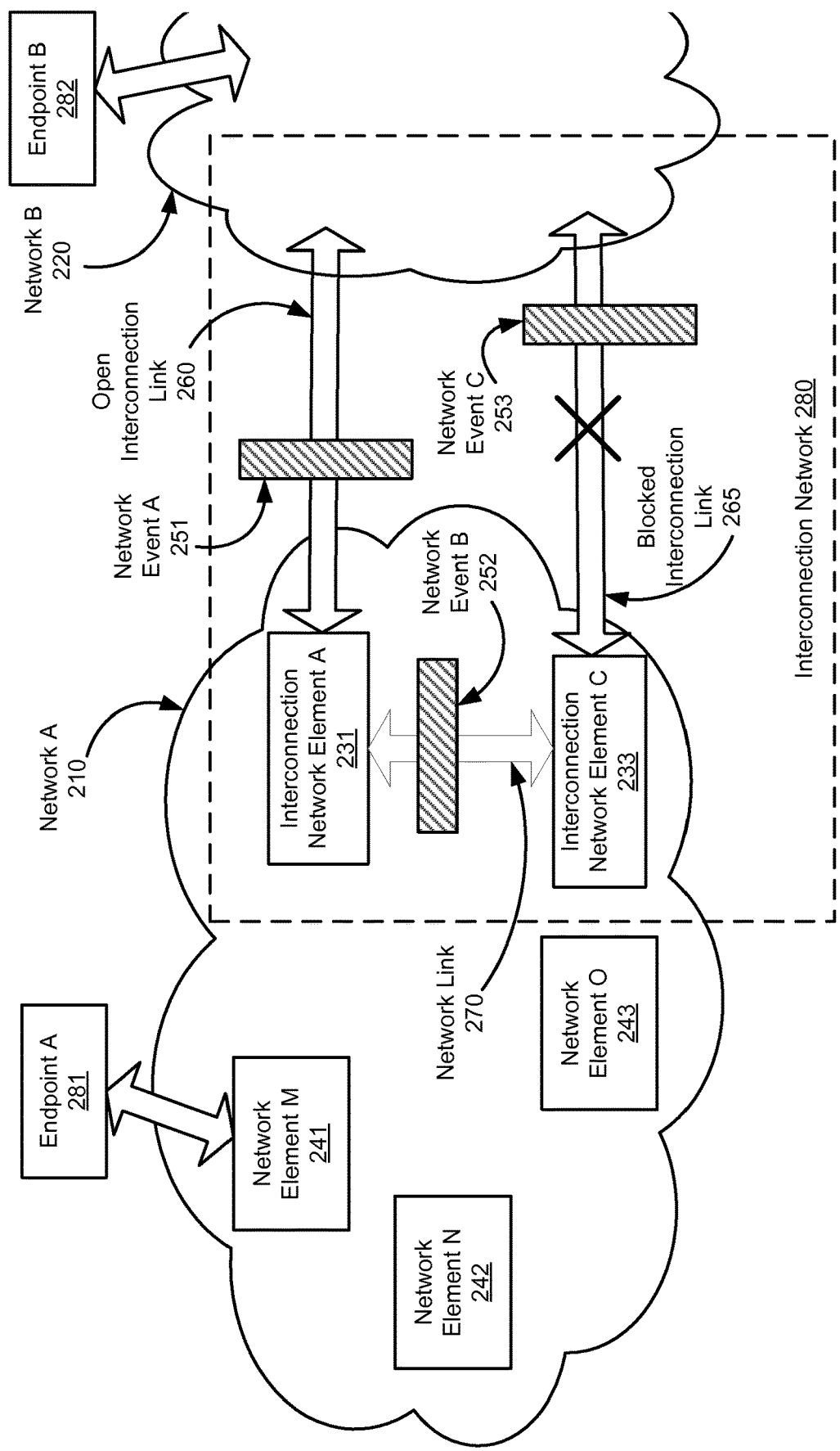

Turning to FIG. 2, FIG. 2 shows a schematic of a system for connecting various networks in accordance with one or more embodiments. As shown in FIG. 2, an interconnection network (280) is connecting two other networks: Network A (210), Network B (220). In other words, the interconnection network (280) implements an interconnection between the two networks (210, 220). The interconnection network (280) is operating on various interconnection network elements (e.g., interconnection network element A (231), interconnection network element C (233)). Both of the interconnection network elements (231, 233) are shared with Network A (210). The interconnection network (280) also shares some interconnection network elements (not shown) with Network B (220).

As also shown in FIG. 2, network A (210) may include additional network elements (e.g., network element M (241), network element N (242), network element O (243)). Moreover, endpoint A (281) is connected to network A (210) and endpoint B (282) is connected to network B (220). The interconnection implemented by the interconnection network (280) plus one or more of the network elements (241, 242, 243) enable data exchange between endpoint A (281) and endpoint B (282). While the endpoints (281, 282) are shown outside the networks (210, 220), in other embodiments, one or more of the endpoints (281, 282) may be located inside network A (210) and/or network B (220).

In one or more embodiments, the interconnection network (280) includes an open interconnection link (260) and a blocked interconnection link (265). The interconnection provided by the interconnection network (280) is implemented by the open interconnection link (260). The open interconnection link (260) enables bidirectional communication between network A (210) (including endpoint A (281) and the various network elements (241, 242, 243)) and network B (220) (including endpoint B (282)). The blocked interconnection link (265) is unavailable (e.g., it has been deliberately disabled) for carrying data between network A (210) and network B (220). Although FIG. 2 only shows two interconnection links (260, 265), those skilled in the art, having the benefit of this detailed description, will appreciate that the interconnection network (280) may have three or more interconnection links. In such embodiments, there may be multiple open interconnection links and/or multiple blocked interconnection links.

In one or more embodiments, the interconnection network elements (231, 233) detect various network events (e.g., network event A (251), network event B (252), network event C (253)) over or on the interconnection network (280). For example, network events may describe various characteristics of links and/or nodes, such as signal failures, signal degradations, a wait-to-block (WTB) expiration, a wait-to-restore (WTR) expiration, a forced switch (FS) (i.e., a block placed on a port where a command is issued), a manual switch (MS) (i.e., in the absence of an FS, a block placed on a port where a command is issued), a clear event (i.e., an event that triggers a restorative operation, e.g., for a WTR or WTB expiration clock, before time has expired for the previous operation), and other network events. In one or more embodiments, a fault on a network link, such as an interconnection link, is a network event detected by interconnection network elements (231, 233) on the interconnection network (280). As shown in FIG. 2, network events may occur on the open interconnection link (260) (e.g., network event A (251)), on the blocked interconnection link (265) (e.g., network event C (253)), and on the network link (270) between interconnection network element A (231) and interconnection network element C (233).

Figure 3:
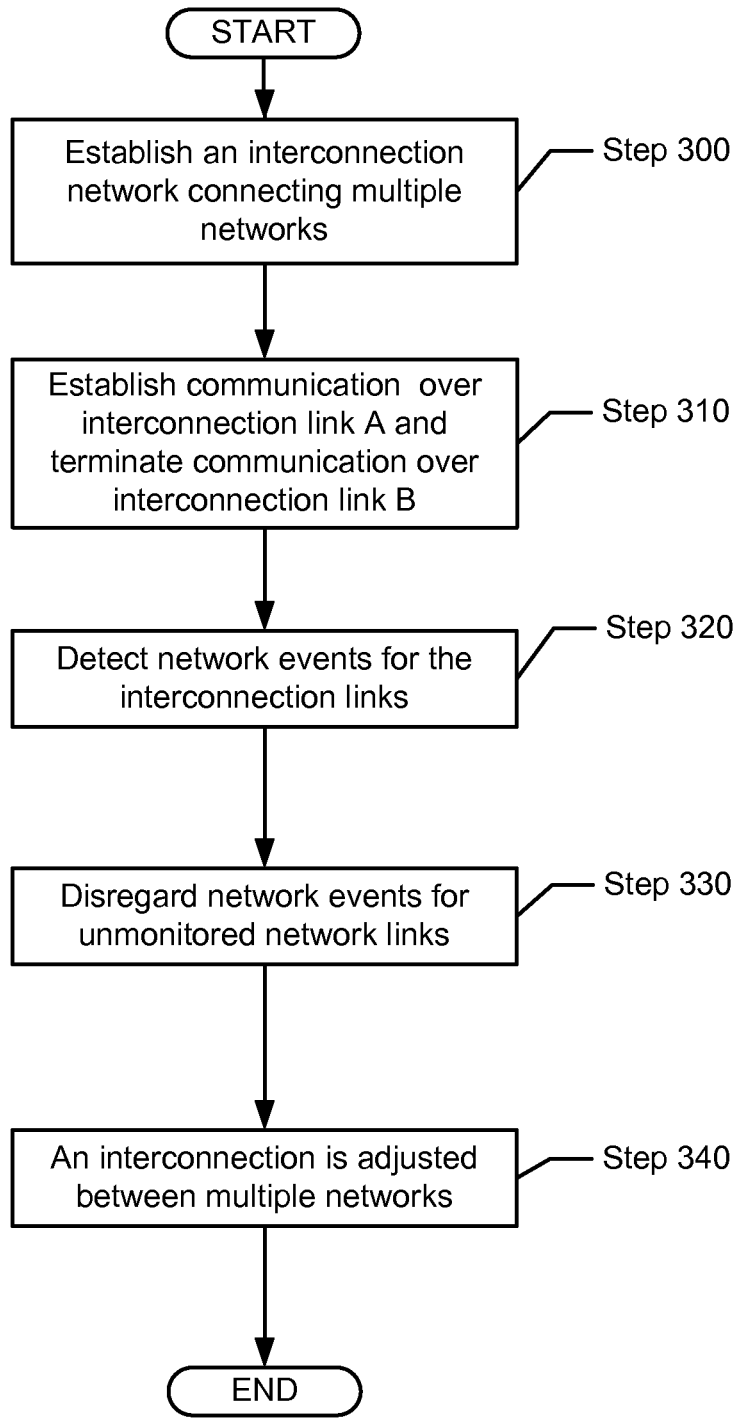
FIGS. 3 and 4 show flowcharts in accordance with one or more embodiments.

FIG. 3 shows a flowchart in accordance with one or more embodiments. Specifically, the process depicted in FIG. 3 may be used to connect various networks. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, an interconnection network connecting multiple networks is established. As discussed above, the interconnection network may include multiple interconnection network elements, multiple interconnection links between the multiple networks, and multiple network links. Various network elements in the multiple networks may be selected for use as interconnection network elements. In one or more embodiments, the interconnection network elements communicate using an interconnection protocol for administering various interconnection links. In one or more embodiments, for example, the interconnection protocol is configured for detecting and communicating the existence of various network events occurring on network links and/or interconnection links in the interconnection network.

In one or more embodiments, the interconnection network is a ring network configured with a ring protocol. Each network element in the ring network is connected to two other network elements. Thus, information (e.g., network messages) may be transmitted by any network element in two different directions around the network ring. When the interconnection network is a ring network, each network link and each interconnection link may be referred to as a ring span. In one or more embodiments, the ring protocol is configured with Ethernet Ring Protection Switching (ERPS).

In one or more embodiments, assume the interconnection network established in Step 300 has at least two interconnection links: interconnection link A and interconnection link B. Moreover, assume interconnection link B is currently operational. In other words, interconnection link B is being used to transport messages/data between the two networks.

In Step 310, communication is established over interconnection link A, while communication is terminated over interconnection link B in accordance with one or more embodiments. In one or more embodiments, the interconnection network established in Step 300 designates interconnection link A as an open interconnection link, and designates interconnection link B as a blocked interconnection link. As such, interconnection link A is used to transport messages/data between the two networks (e.g., between endpoint A and endpoint B in FIG. 2). Although interconnection link B is blocked for communication between endpoints (e.g., endpoint A and endpoint B in FIG. 2), the interconnection network elements forming interconnection link B may still use interconnection link B for communicating messages needed for the administration of the interconnection network in accordance with the network topology protocol being implemented. In one or more embodiments, interconnection link B is a backup path for an interconnection between two networks. In other words, should interconnection link A fail, interconnection link B may be opened (i.e., unblocked) to transport messages/data between the two networks.

In one or more embodiments, interconnection link B in Step 310 is a ring protection link (RPL) in a ring network. The ring protection link may be administered by an RPL owner node (e.g., an interconnection network element) that is configured to establish or communicate between endpoints over the RPL.

In one or more embodiments, a network topology protocol administers interconnection link A and/or interconnection link B to produce a loop-free interconnection between various networks. A network loop may occur where various network elements have multiple paths available for communicating with other network elements. For example, a source network element may determine a network path that includes an intervening network element to a destination network element. However, the intervening network element may unfortunately determine that a desired network path to the destination network element goes through the source network element. As such, a network loop may result between the source network element and the intervening network element. Thus, the network topology protocol may eliminate network loops from interconnection links (i.e., where different network elements in a network select paths that use different interconnection links) by blocking one or more interconnection links between two networks and leaving only one interconnection link as the open interconnection link.

In one or more embodiments, for example, the network topology protocol is a spanning tree protocol (STP) (e.g., a rapid spanning tree protocol (RSTP)). As such a spanning tree protocol may generate a spanning tree with various network links and/or nodes, while disabling network links that are not part of the spanning tree. As such, the spanning tree protocol may select interconnection link A to be included in the spanning tree, while removing interconnection link B from the spanning tree. The spanning tree protocol may be operated by an interconnection network or by another network (e.g., network A (210) or network B (220)).

In Step 320, various network events are detected for various interconnection links in accordance with one or more embodiments. In one or more embodiments, an interconnection network or a network operator/administrator selects various interconnection links for network event monitoring. As such, when an interconnection network element detects a network event on a selected interconnection link, the interconnection network element may transmit messages to other interconnection network elements to adjust an interconnection between the two or more networks. For example, detecting a fault on a particular interconnection link causes an interconnection network to block the particular interconnection link and open a different interconnection link to resume the transport of messages/data between the networks.

In Step 330, network events for unmonitored network links are disregarded in accordance with one or more embodiments. As discussed above, in one or more embodiments, various network links are specifically not monitored for network events. For example, if a fault occurs on one of the unmonitored network links, the fault may be ignored and any message associated with the fault may be ignored. In one or more embodiments, for example, interconnection link A and/or interconnection link B in Step 310 are designated for event monitoring, while events on other network links between interconnection network elements are ignored. In one or more embodiments, various network event messages for a non-interconnection network link are ignored (i.e., only interconnection links are monitored).

In Step 340, the interconnection is adjusted between multiple networks in accordance with one or more embodiments. Specifically, communication is established over interconnection link B and communication is terminated over interconnection link A in accordance with one or more embodiments. For example, a fault may be detected on interconnection link A. In response to the fault, the interconnection network may rearrange the interconnection between two networks by opening interconnection link B for communication. At a future point, when the fault on interconnection link A is cleared, the interconnection network may switch back to interconnection link A for multipoint-to-multipoint communication, and block traffic over interconnection link B.

Figure 4:
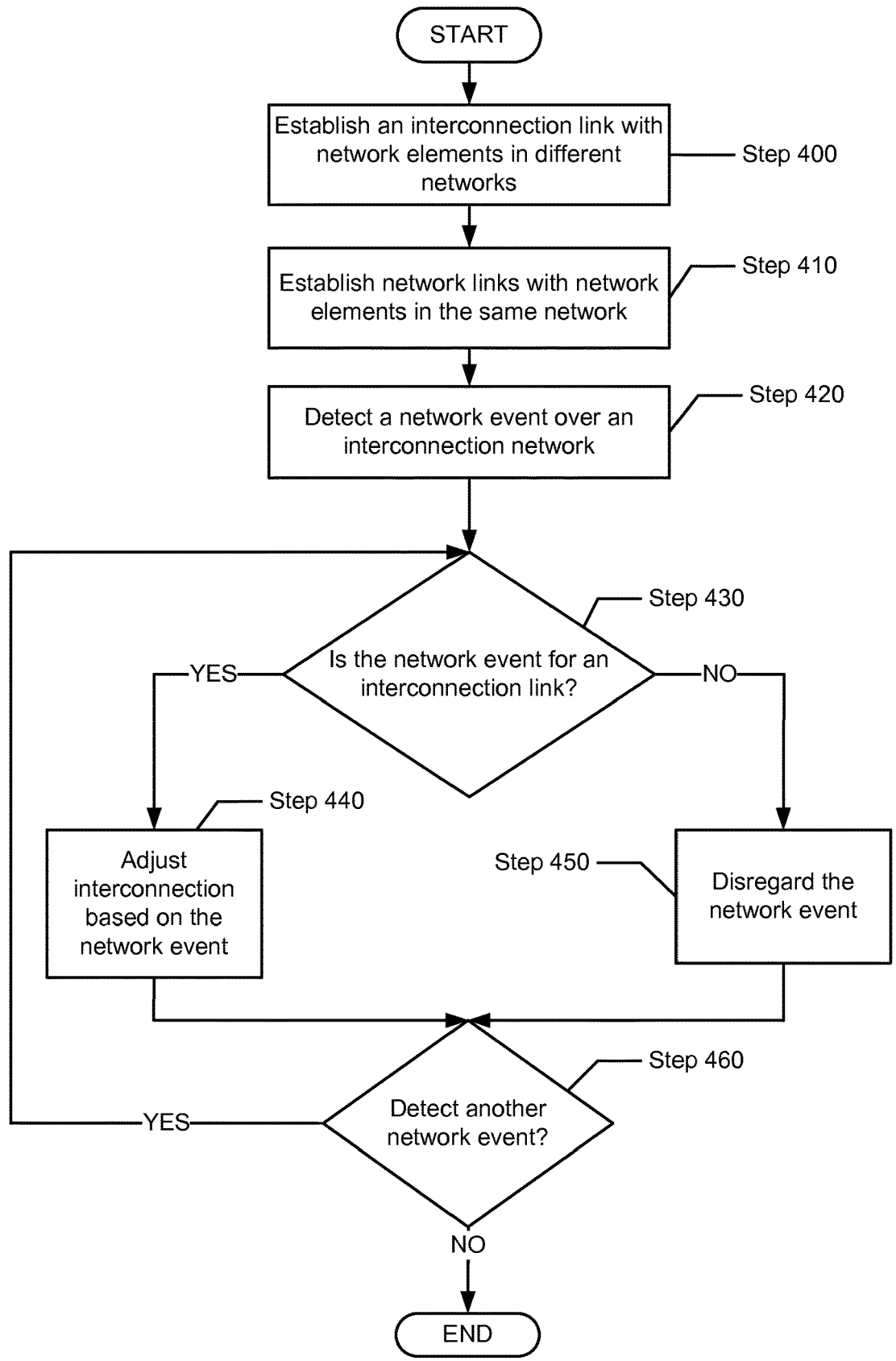

FIG. 4 shows a flowchart in accordance with one or more embodiments. Specifically, one or more steps in FIG. 4 may be performed by a network element, such as an interconnection network element. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, interconnection links are established between network elements located in different networks in accordance with one or more embodiments. These network elements may now be referred to as interconnection network elements. After the interconnection links are established, endpoints in one network may communicate with endpoints in a different network.

In Step 410, network links are established between interconnection network elements within the same network in accordance with one or more embodiments. This may facilitate communication between the interconnection elements located in the same network. A network link may be a physical path or a logical path, for example.

In Step 420, a network event is detected in accordance with one or more embodiments. Specifically, an interconnection protocol operating among various interconnection network elements may detect a particular network event. For example, an interconnection network element may ping an adjacent interconnection network element to determine whether a particular link is still operational. If the interconnection network element fails to receive an acknowledgement to the ping, the interconnection network element may determine that a network event (e.g., a fault) has occurred. Upon detecting the network event, the interconnection network element may transmit information regarding the network event to other interconnection network elements in the interconnection network.

In one or more embodiments, various messages between network elements on an interconnection network are designated as network events. For example, messages relating to faults on network links may be categorized as network events. On the other hand, messages transmitted over the interconnection network for adjusting an interconnection between two networks or the interconnection network's topology may not be categorized as being with respect to network events.

In one or more embodiments, a message regarding a network event includes a link attribute. The link attribute may be assigned by the initial network element transmitting the message and designate whether the network event is associated with an interconnection link or another type of network link. As such, the determination in Step 430 below may be performed by examining the link attribute of a message obtained for a particular network event.

In one or more embodiments, a network event on a network link is detected by both network elements that make up the network link. For example, in a ring network, when a fault is detected on a particular network link, both of the interconnection network elements may transmit, in opposite directions over the ring, a message that describes the fault until substantially all interconnection network elements in the ring network are aware of the fault.

In Step 430, a determination is made whether the network event is for an interconnection link in accordance with one or more embodiments. In one or more embodiments, for example, the network event detected in Step 420 is analyzed for whether the network event corresponds to an interconnection link or a network link that is not used to provide an interconnection between various networks. When it is determined that the network event is for an interconnection link, the process proceeds to Step 440. When it is determined that the network event is not for an interconnection link, the process proceeds to Step 450. In Step 440, an interconnection is adjusted based on a network event in accordance with one or more embodiments. For example, one or more characteristics of an interconnection topology between two networks may be changed. This adjustment may include limiting the amount of traffic transmitted over an interconnection link. This adjustment may include opening an additional interconnection link, and/or blocking an additional interconnection link. In one or more embodiments, for example, the interconnection topology between two networks is adjusted similar to Step 340 in FIG. 3 above.

In Step 450, the network event is disregarded in accordance with one or more embodiments. For example, the interconnection between two networks is not adjusted for the now-disregarded network event. As such, if the disregarded network event is for a fault, the interconnection between two networks may continue as if the now-disregarded event never happened.

In one or more embodiments, a network element is configured to perform a null action in response to detecting a network element associated with a non-interconnection link. For example, in a table designating various actions for various network events, the network event in Step 450 may correspond to a "null" action in the table.

In Step 460, a determination is made whether another network event is detected in accordance with one or more embodiments. If another network event is detected, the process may proceed to Step 430. If no further network events are detected, the process may end.

As discussed above, during the process depicted in FIG. 4, a message is received regarding a network event, and the message is discarded if the network event does not pertain to a network link that is being monitored. In one or more embodiments, a network element on an interconnection network only monitors interconnection links for network events. As such, if a network event occurs on a network link that is not an interconnection link, the network element may not even detect that the network event occurred. In one or more embodiments, the network element may mask events from various network interfaces.

In one or more embodiments, a port for a non-interconnection link is blocked by a network element on an interconnection network. For example, any network event messages transmitted over the interconnection network for the non-interconnection link may never be received by the network element. As such, a network element may only receive network event messages for interconnection links.

Figure 5:
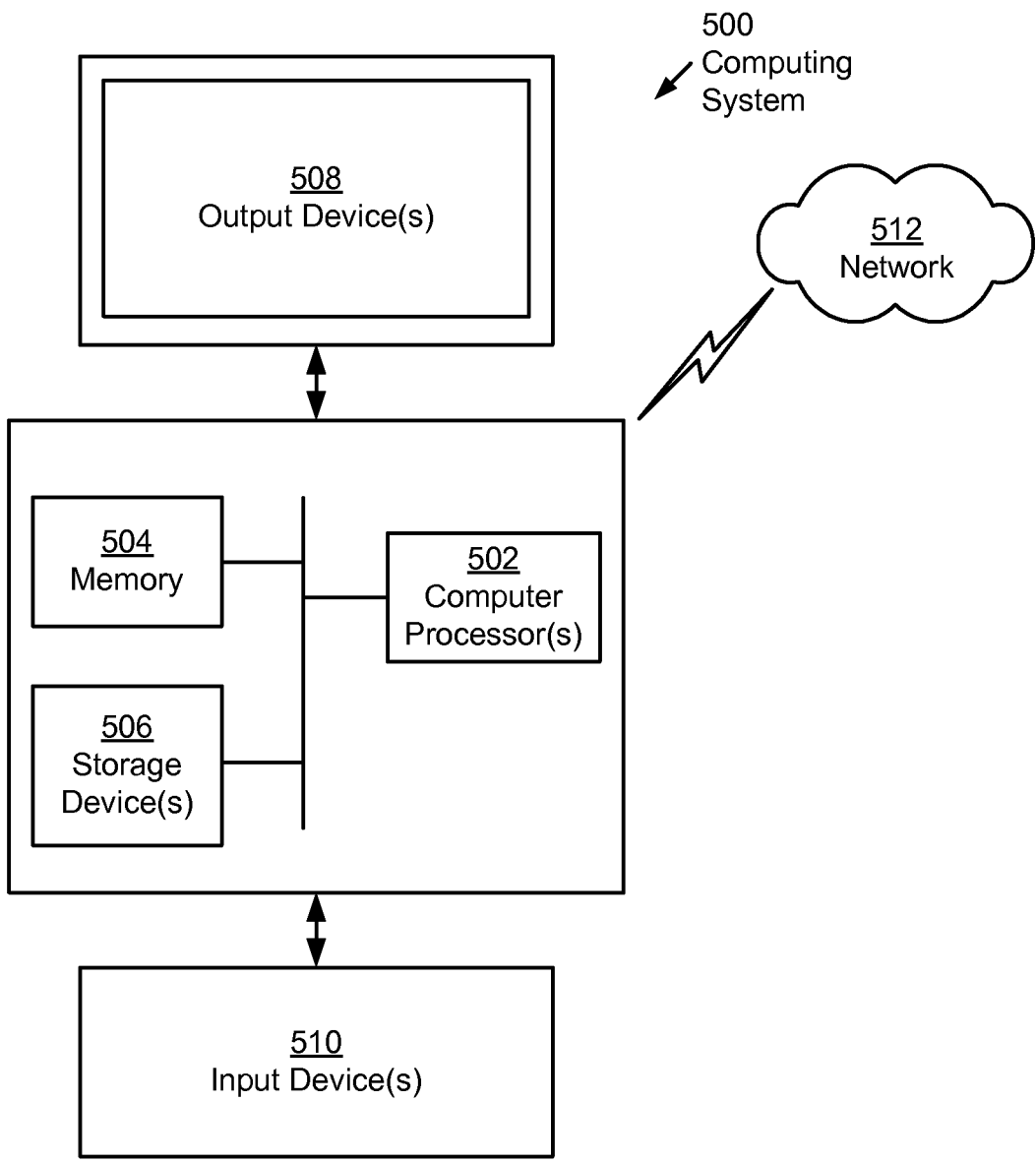
FIG. 5 shows a computing system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Additionally, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for connecting a plurality of networks, comprising:
    establishing a first interconnection link of a virtual network between a first network element located on a first network and a second network element located on a second network, wherein the first interconnection link of the virtual network implements an interconnection that provides communication between a first plurality of nodes in the first network and a second plurality of nodes in the second network;
    designating a second interconnection link of the virtual network between a third network element located on the first network and a fourth network element located on the second network as a blocked interconnection link such that communication between the third network element and the fourth network element is blocked except for messages used for administration of the virtual network;
    establishing a network link of the virtual network with the first network element and within the first network;
    detecting, over the virtual network, a fault regarding the first interconnection link;
    in response to detecting the fault on the first interconnection link, adjusting the interconnection between the first network and the second network to the second interconnection link of the virtual network such that communication between the third network element and the fourth network element is unblocked;
    designating, by an interconnection network protocol operating on the virtual network, the network link as an unmonitored network link; and
    blocking, by the first network element and in response to designating the network link as the unmonitored network link, a port on the first network element that results in all network event messages associated with a second fault on the unmonitored network link being disregarded.

2. The method of claim 1, further comprising:
    detecting a network event;
    determining whether the network event corresponds to one selected from a group consisting of the first interconnection link or the network link; and
    in response to a determination that the network event corresponds to the network link, disregarding the network event.

3. The method of claim 1, further comprising:
    wherein the network link is established between the first network element and the third network element.

4. The method of claim 1, wherein adjusting the interconnection comprises:
    terminating, in response to detecting the fault, communication over the first interconnection link of the virtual network between the first plurality of nodes in the first network and the second plurality of nodes in the second network; and
    establishing communication over the second interconnection link of the virtual network between the first plurality of nodes and the second plurality of nodes.

5. The method of claim 1, further comprising:
    detecting, over the virtual network, a network event regarding the first interconnection link, wherein the network event is a clear event that triggers a restorative operation;
    re-designating the second interconnection link of the virtual network as the blocked interconnection link such that communication between the third network element and the fourth network element is blocked except for the messages used for the administration of the virtual network in response to detecting the network event; and
    establishing communication over the first interconnection link of the virtual network between the first plurality of nodes in the first network and the second plurality of nodes in the second network.

6. The method of claim 1,
    wherein the virtual network is a ring network configured to operate a ring protocol comprising Ethernet Ring Protection Switching,
    wherein the first network element and the second network element are configured to transmit network messages bidirectionally using the ring protocol over the virtual network,
    wherein the first network and the second network are mesh networks, and
    wherein the first interconnection link is designated by a spanning tree protocol that is operated by the first network for transporting network data to the second network.

7. A system for connecting a plurality of networks, comprising:
- a first network element located in a first network;
- a second network element located in a second network and connected to the first network element by a first interconnection link of a virtual network of, wherein the first interconnection link of the virtual network implements an interconnection that provides communication between a first plurality of nodes in the first network and a second plurality of nodes in the second network;
- a third network element located in the first network and connected to the first network element by a first network link; and
- a fourth network element located in the second network, connected to the second network element by a second network link, and connected to the third network element by a second interconnection link of the virtual network, wherein the second interconnection link is designated as a blocked interconnection link such that communication between the third network element and the fourth network element is blocked except for messages used for administration of the virtual network,
- wherein the system is configured for adjusting the interconnection between the first network and the second network to the second interconnection link in response to detecting, over the virtual network, a fault on the first interconnection link, such that communication between the third network element and the fourth network element is unblocked,
- wherein the virtual network is configured to operate an interconnection network protocol that is configured to designate the first network link as an unmonitored network link, and
- wherein, in response to designating the first network link as the unmonitored network link, the first network element is further configured to block a port on the first network element that results in all network event messages associated with a second fault on the unmonitored network link being disregarded.

8. The system of claim 7, wherein the first network element is configured to terminate, in response to detecting the fault, communication over the first interconnection link between the first plurality of nodes in the first network and the second plurality of nodes in the second network.

9. The system of claim 7, further comprising:
- wherein the first network element is configured to adjust the interconnection in response to detecting a network event on the second interconnection link.

10. The system of claim 7,
- wherein the virtual network is a ring network configured to operate a ring protocol comprising Ethernet Ring Protection Switching,
- wherein the first network element and the second network element are configured to transmit network messages bidirectionally using the ring protocol over the virtual network, wherein the first network and the second network are mesh networks, and
- wherein the first interconnection link is designated by a spanning tree protocol that is operated by the first network for transporting network data to the second network.

11. A non-transitory computer readable medium storing instructions for connecting a plurality of networks, the instructions, when executed by a computer processor, comprising functionality for:
- establishing a first interconnection link of a virtual network between a first network element located on a first network and a second network element located on a second network, wherein the first interconnection link of the virtual network implements an interconnection that provides communication between a first plurality of nodes in the first network and a second plurality of nodes in a second network;
- designating a second interconnection link of the virtual network between a third network element located on the first network and a fourth network element located on the second network as a blocked interconnection link such that communication between the third network element and the fourth network element is blocked except for messages used for administration of the virtual network;
- establishing a network link of the virtual network with the first network element and within the first network;
- detecting, over the virtual network, a fault regarding the first interconnection link;
- in response to detecting the fault, adjusting the interconnection between the first network and the second network to the second interconnection link of the virtual network such that communication between the third network element and the fourth network element is unblocked;
- designating, by an interconnection protocol operating on the virtual network, the network link as an unmonitored network link; and
- blocking, in response to designating the network link as the unmonitored network link, a port on the first network element that results in disregarding all network event messages associated with the unmonitored network link being disregarded.

12. The non-transitory computer readable medium of claim 11, further comprising instructions, when executed by the computer processor, comprising functionality for:
- detecting a network event;
- determining whether the network event corresponds to one selected from a group consisting of the first interconnection link and the network link; and
- in response to a determination that the network event corresponds to the network link, disregarding the network event.

13. The non-transitory computer readable medium of claim 11, the instructions for adjusting the interconnection comprising functionality for:
- terminating, in response to detecting the fault, communication over the first interconnection link of the virtual network between the first plurality of nodes in the first network and the second plurality of nodes in the second network; and
- establishing communication over the second interconnection link of the virtual network between the first plurality of nodes and the second plurality of nodes.

14. The non-transitory computer readable medium of claim 11, further comprising instructions, when executed by the computer processor, comprising functionality for:
- detecting, over the virtual network, a network event regarding the first interconnection link, wherein the network event is a clear event that triggers a restorative operation;
- re-designating the second interconnection link of the virtual network as the blocked interconnection link such that communication between the third network element and the fourth network element is blocked except for the messages used for the administration of the virtual network in response to detecting the network event; and establishing communication over the first interconnection link of the virtual network between the first plurality of nodes in the first network and the second plurality of nodes in the second network.

15. The non-transitory computer readable medium of claim 11, wherein the virtual network is a ring network configured to operate a ring protocol comprising Ethernet Ring Protection Switching, wherein the first network element and the second network element are configured to transmit network messages bidirectionally using the ring protocol over the virtual network, wherein the first network and the second network are mesh networks, and wherein the first interconnection link is designated by a spanning tree protocol that is operated by the first network for transporting network data to the second network.

\* \* \* \* \*